(12) United States Patent
Wang et al.

(10) Patent No.: US 9,053,657 B2
(45) Date of Patent: Jun. 9, 2015

(54) TWO-WAY HDMI COMMUNICATION

(75) Inventors: Yeqing Wang, Horsham, PA (US);
Brian M. Carroll, Quakertown, PA (US)

(73) Assignee: Google Technology Holdings, Mountain View, CA (US)

( * ) Notice: Subject to any disclaimer, the term of this patent is extended or adjusted under 35 U.S.C. 154(b) by 0 days.

(21) Appl. No.: 13/572,057

(22) Filed: Aug. 10, 2012

(65) Prior Publication Data
US 2014/0043538 A1    Feb. 13, 2014

(51) Int. Cl.
| G06F 3/00 | (2006.01) |
| G09G 5/00 | (2006.01) |
| H04N 5/775 | (2006.01) |
| H04N 21/4363 | (2011.01) |

(52) U.S. Cl.
CPC .......... *G09G 5/006* (2013.01); *G09G 2330/021* (2013.01); *G09G 2370/12* (2013.01); *H04N 5/775* (2013.01); *H04N 21/43635* (2013.01)

(58) Field of Classification Search
CPC ...................................................... G09G 5/006
USPC .......................................................... 710/14
See application file for complete search history.

(56) References Cited

U.S. PATENT DOCUMENTS 6,800,962 B2 * 10/2004 Bahl et al. ................. 307/52
2011/0283129 A1 * 11/2011 Guillerm ..................... 713/324

FOREIGN PATENT DOCUMENTS

EP        2362643 A1    8/2011

OTHER PUBLICATIONS

Patent Cooperation Treaty, International Search Report and Written Opinion of the International Searching Authority for International Application No. PCT/US2013/054134, Jan. 3, 2014 9 pages.

* cited by examiner

*Primary Examiner* — Henry Tsai
*Assistant Examiner* — Dean Phan (57) ABSTRACT

A device is provided for use with an audiovisual device and an HDMI cable having a first end and a second end. The first end can connect to the audiovisual device, whereas the second end can connect to the device. The audiovisual device can provide power to the power line of the HDMI cable when providing the digital television audiovisual signals. The device includes an output portion, and input portion and a control portion. The output portion can provide output signals as the digital television audiovisual signals to the second end. The input portion can receive input signals as the digital television audiovisual signals from the second end. The control portion can instruct the output portion to output the digital television audiovisual signals to the second end or can instruct input portion to receive the digital television audiovisual signals from the second end based on the power.

20 Claims, 9 Drawing Sheets

TWO-WAY HDMI COMMUNICATION

CROSS-REFERENCE TO RELATED APPLICATION

Related subject matter is disclosed in the following patent application, which is commonly owned and co-pending with the present application, and the entire contents of which are hereby incorporated by reference: U.S. Application Ser. No. 13/572,066, filed on Aug. 10, 2012, entitled "POWER FOR AN HDMI SOURCE DEVICE".

BACKGROUND

The present invention relates to two way communication of a single dynamic configured high definition multimedia interface (HDMI) cable. HDMI is a digital interface that is capable of carrying high-definitional video and digital audio channels all in one cable. HDMI delivers high quality audio and video without the risk of quality loss due to the conversion or compression of a video or audio signal.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Aspects of the present invention provide a system and method for using a single port to transmit and receive content via an HDMI cable. The use of a single port eliminates the need for a secondary port or HDMI cable to transmit and receive content from a single device.

In accordance with aspects of the present invention, a device is provided for use with an audiovisual device and an HDMI cable having a first end and a second end. The audiovisual device can receive or provide digital television audiovisual signals. The first end of the HDMI cable can connect to the audiovisual device, whereas the second end of the HDMI cable can connect to the device. The audiovisual device can provide a first amount of power to a power line of the HDMI cable when providing digital television audiovisual signals. The device includes an output portion, and input portion and a control portion. The output portion can provide digital television audiovisual signals as output signals to the second end of the HDMI cable. The input portion can receive digital television audiovisual signals as input signals from the second end of the HDMI cable. The control portion can instruct the output portion to output digital television audiovisual signals to the second end of the HDMI cable or can instruct the input portion to receive digital television audiovisual signals from the second end of the HDMI cable based on whether the audiovisual device provides the first amount of power to the power line of the HDMI cable.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

Since HDMI cables are able to support point to point communication between devices HDMI is capable of utilizing a "plug and display" feature. "Plug and display" refers to HDMIs ability to support hot plug and ability to choose optimal display characteristics such as resolution, contrast, and color between two devices that are connected via an HDMI cable.

Figure 1:
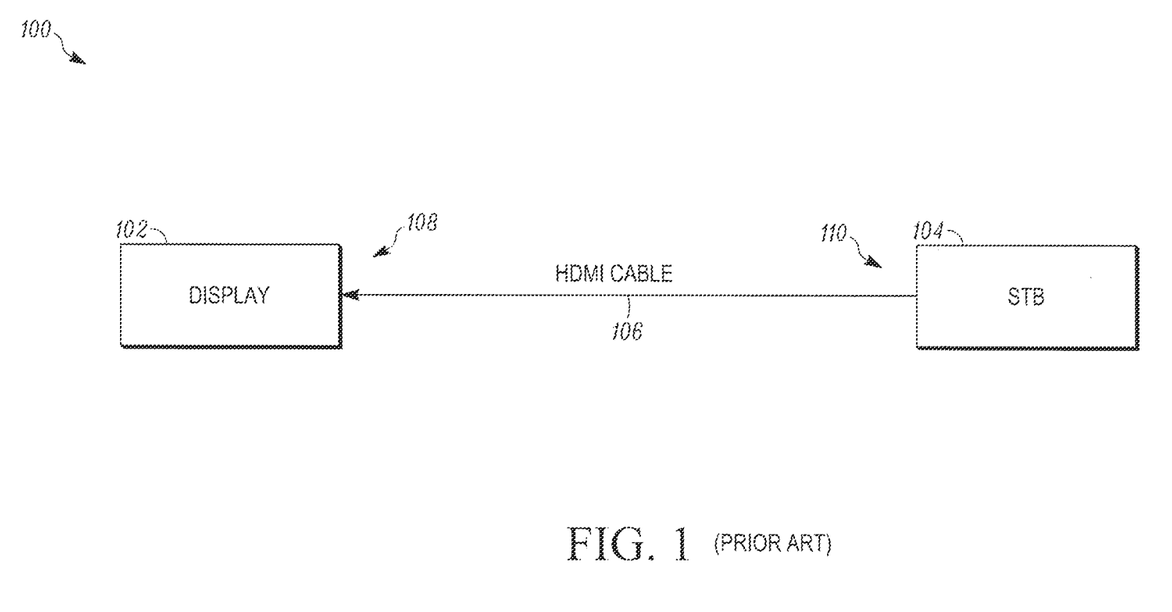
FIG. 1 illustrates a block diagram for a prior art STB—display system 100.

FIG. 1 illustrates a block diagram for a prior art set top box (STB) and display system 100. It should be noted that a STB and a display are provided for purposes of discussion, and that any HDMI sink (consuming video data) and source (providing video data) may be used.

As illustrated in the figure, system 100 includes a display 102, a STB 104, an HDMI cable 106, an HDMI connector 108, and an HDMI connector 110.

STB 104 is arranged to transmit content, via HDMI connector 110, through HDMI cable 106. Display 102 is arranged to receive content transmitted by STB 104 through HDMI cable 106, via HDMI connector 108.

Display 102 is a content display device that is operable to present images that it receives electronically for visual reception. A non-limiting example of display 102 may be an LED television, an LCD computer monitor, or plasma television.

STB 104 is an information appliance device that is operable to receive an external source of signal and then process the signal into content which can be transmitted to a display device. The external source signal is generally transmitted by a cable television or satellite television content provider. It should be noted that an external source of signal could be internet content or locally stored content on the source device, e.g. video files on a PC or tablet, CD/DVD media, etc.

HDMI cable 106 is a compact audio/video interface that is operable to transmit uncompressed digital data from a content provider to a content display.

The operation of system 100 will now be described in greater detail with additional reference to FIG. 2.

Figure 2:
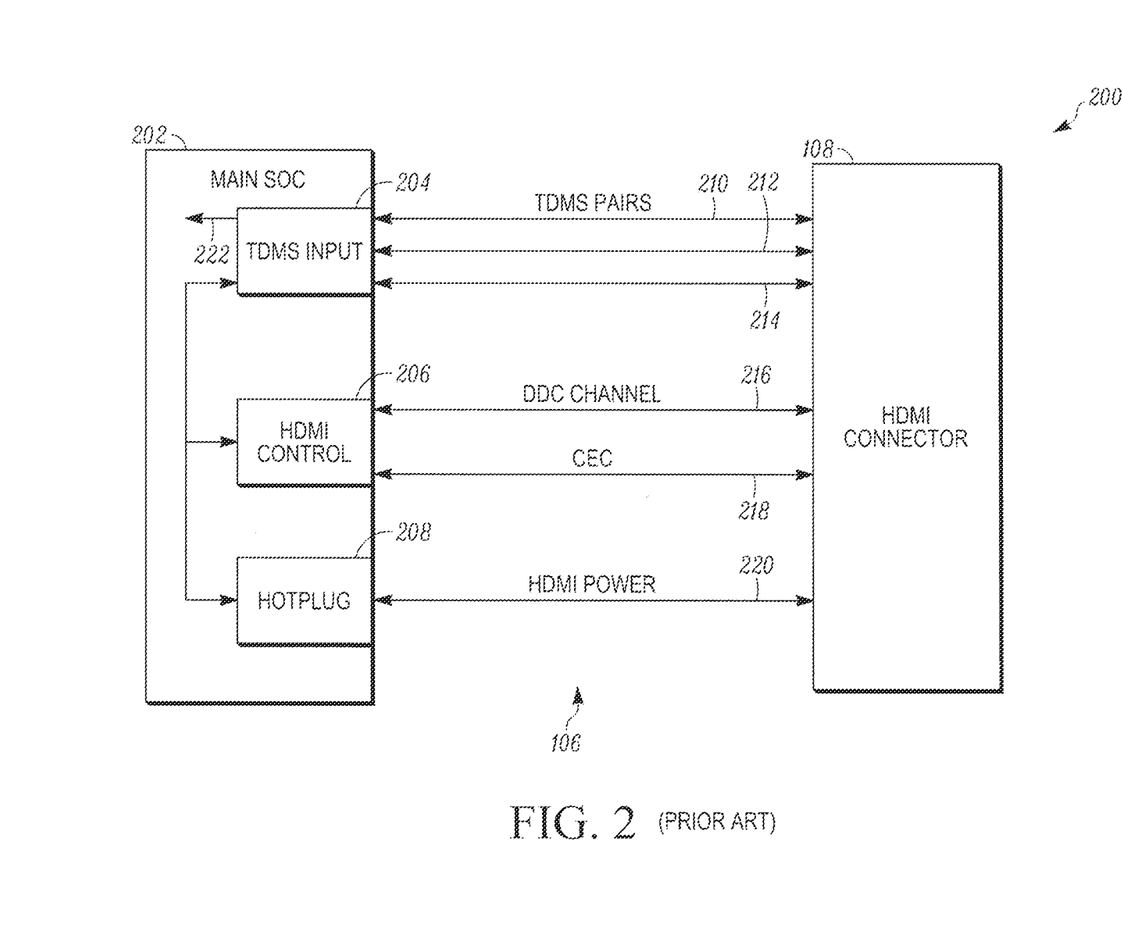
FIG. 2 illustrates a circuit diagram for a prior art HDMI cable and main SOC interface 200.

FIG. 2 illustrates a prior art HDMI display system 200 wherein data is being transmitted from a STB to a display.

As illustrated in FIG. 2, system 200 includes HDMI cable 106, HDMI connector 108, a main system on chip (main SOC) 202, a transition minimized differential signaling (TDMS) module 204, an HDMI control module 206, and a hotplug module 208.

TDMS pair 210, TDMS pair 212, TDMS pair 214, DDC channel 216, CEC channel 218, and HDMI power 220 are all separate connections that are contained within in HDMI cable 106 of FIG. 1.

Main SOC 202 is arranged to receive a plurality of signals from a content provider via HDMI connector 108. Main SOC 202 is operable to drive a display by using content received from a content provider via HDMI connector 108. Main SOC 202 represents the chip of display 102 to which HDMI cable 106 is connected.

TDMS module 204 is operable to receive three separate components of content transmitted by STB 104. The blue component of the content is received via TDMS pair 210, the green component of the content is received via TDMS pair 212, and the red component of the content is received via TDMS pair 214. The content is transferred to TDMS pair 210, TDMS pair 212, and TDMS pair 214 from HDMI cable 106 via HDMI connector 108.

HDMI control module 206 is operable to receive display data channel (DDC) signal 216 and consumer electronics control (CEC) 218 from a content provider via HDMI connector 108. DDC signal 216 is used by the HDMI source device to read the data from the HDMI sink device to learn about the video formats that are supported.

CEC 218 is a signal that allows a user to command and control up to ten CEC-enabled devices that are connected through HDMI, by using only a single controller.

Hotplug module 208 is operable to receive power from HDMI power source 220. Hotplug module 208 is additionally operable to provide power to main SOC 202. It should be noted that that hotplug module 208 includes two lines (not shown). A source line supplies 5V power and then a sink will use this power to a pull hotplug pin (not shown) on HDMI connector 108 to a high state.

In operation, a user will want to transmit content from STB 104 to display 102 using HDMI cable 106. Once HDMI cable 106 is connected to both STB 104 and display 102, the user will turn on STB 104. STB 104 will send power through HDMI cable 106, which is then received by hotplug module 208 via HDMI power 220. Once 5V has been detected by hotplug module 208, it informs HDMI control 206 and TDMS input 204 that it is connected to a content transmitter.

After display 102 has been turned on and a connection has been detected by hotplug module 208, HDMI control module 206 is able to communicate with STB 104 via DDC signal 216 to determine optimum display settings. HDMI control module 206 will transmit display modes that are supported by display 102 to STB 104. Once STB 104 receives the display modes that are supported by display 102, it can choose the optimum display setting and transmit the setting back to HDMI control module 206. After HDMI control module 206 receives the selected display setting, it can adjust display parameters such as resolution, brightness, and contrast.

Once a display setting has been chosen STB 104 will begin transmitting content to TDMS module 204 via TDMS pair 210, TDMS pair 212, and TDMS pair 214. Each TDMS pair transmits either a red, blue, or green component of the content that is being transmitted from STB 104 to display 102. The content is received by TDMS module 204 which then sends the content to the display via signal 222.

Figure 3:
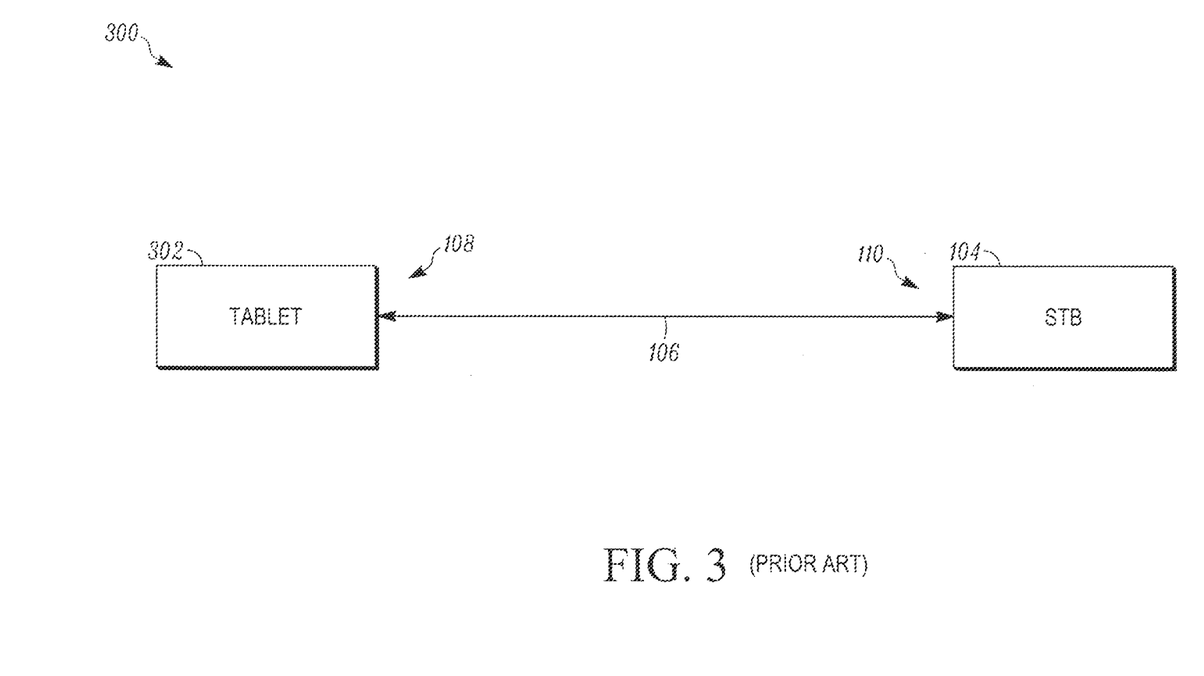
FIG. 3 illustrates a block diagram for a prior art STB-tablet system 300.

FIG. 3 illustrates a block diagram for a prior art set top box (STB) and tablet system 300.

As illustrated in the figure, system 300 includes STB 104, HDMI cable 106, connector 108, connector 110, and a tablet 302.

STB 104 is arranged to transmit content, via connector 110, through HDMI cable 106. Tablet 302 is arranged to receive content transmitted by STB 104 through HDMI cable 106, via connector 108.

Tablet 302 is a mobile computer that is capable of receiving and displaying content. A tablet is a mobile computer that has been integrated into a flat touch screen and is primarily operated by the touch screen rather than a physical keyboard.

The operation of system 300 is very similar to that of system 100 as described above. First, a user will want to transmit content from STB 104 to tablet 302 using HDMI cable 106.

A user will turn on STB 104 with a controller or manually, once STB 104 is turned on it delivers power to hotplug module 208 via HDMI power 220. At this time hotplug detection is established as described above in FIG. 2. HDMI control module 206 may or may not receive a CEC signal depending on if STB 104 and tablet 302 are CEC-enabled. Once power has been provided to main SOC 202 components and both STB 104 and tablet 302 have been turned on, the optimum display setting is chosen via DDC channel 216 as described above.

After a display setting has been chosen STB 104 will transmit content through HDMI cable 106 via TDMS pair 210, TDMS pair 212, and TDMS pair 214. The content transmitted over the TDMS pairs is received by TDMS module 204 and is displayed on tablet 302.

Figure 4:
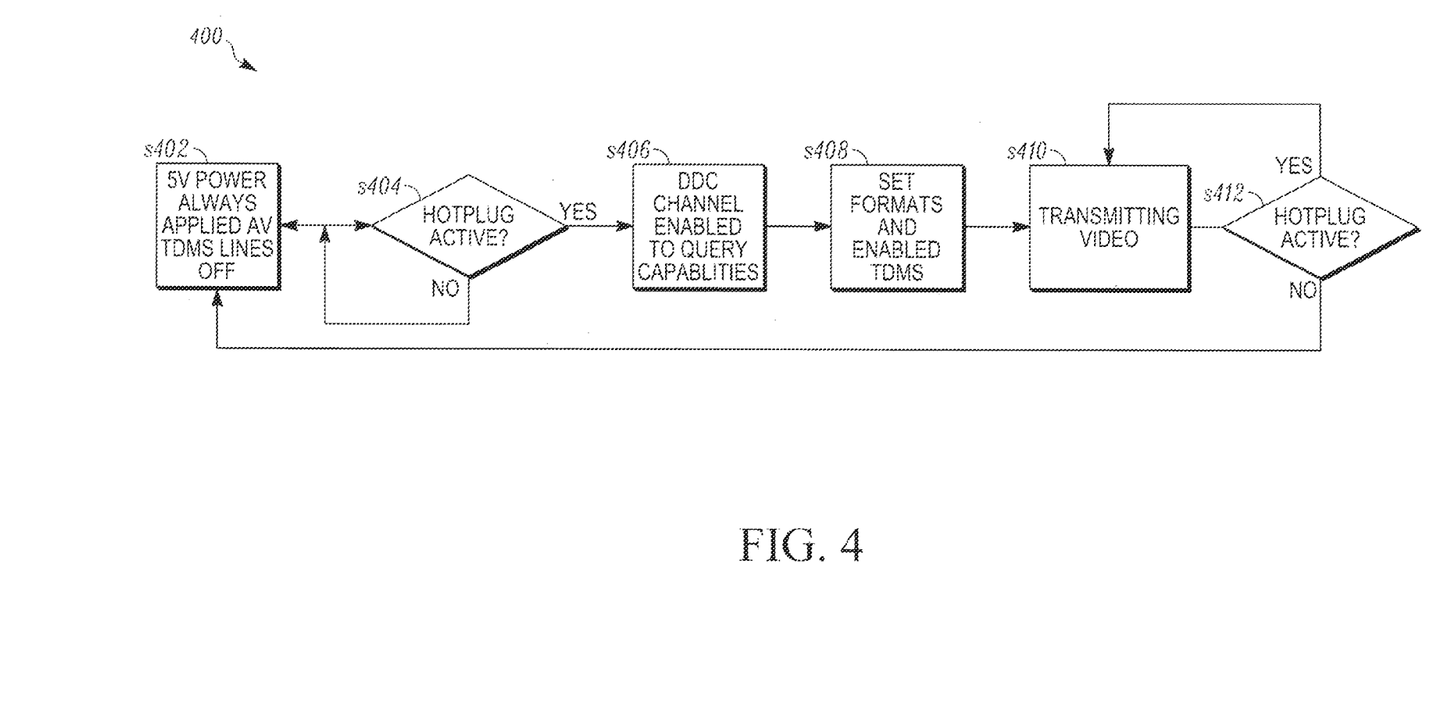
FIG. 4 illustrates a flowchart 400 for the detection of a connection by a content transmitter.

FIG. 4 illustrates a flowchart 400 that describes the operation of a connection detector within a content transmitter.

Initially the system starts and a constant 5V power is constantly being applied to the content transmitter and all TDMS lines are off. For example, with reference to FIG. 3, initially STB 104 is turned on but is not connected to tablet 302, (S402).

Once the system is turned on and power is supplied, a connection may or may not be detected via the activation of a hotplug. If the hotplug is not active, the system will remain in its current state until 5V is detected by the hotplug, signaling a connection has been made (S404).

After a connection has been detected, the content transmitter will query the content receiver about optimum display settings via a DDC channel. The receiver of content will respond to the transmitter of content via the DDC channel with the optimum display settings such as resolution, contrast, and brightness. (S406). For example, with reference to FIG. 3, once tablet 302 and STB 104 are connected, STB 104 will query tablet 302, via a DDC channel about its optimal display settings. After an initial query by STB 104, tablet 302 will send optimal display settings back to STB 104 via the DDC channel.

After receiving the optimum display settings from the receiver of content, the content transmitter will set its output settings to match those received from the content receiver. After changing the format settings, the content transmitter will additionally enable the TDMS lines (S408).

Once the TDMS lines have been enabled, the content transmitter will begin transmitting content to a content receiver (S410).

The content transmitter will continue to transmit content via TDMS lines as long as the hotplug is active. If the connection is interrupted or disconnected and the hotplug becomes inactive, the TDMS lines will become inactive and the system will return to (S402), (S412).

Figure 5:
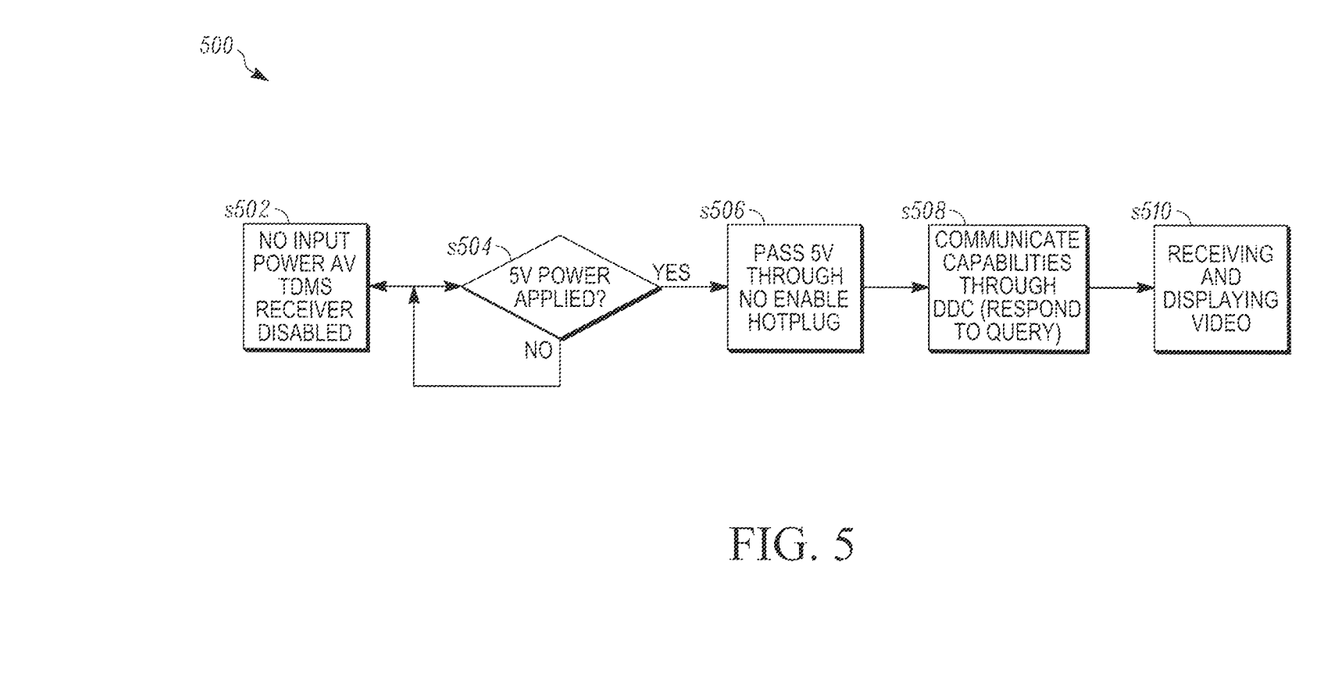
FIG. 5 illustrates a flowchart 500 for the detection of a connection by a content receiver.

FIG. 5 illustrates a flowchart 500 that describes the operation of a connection detector within a content receiver.

Initially, the content receiver is not connected to a content transmitter so there is no input power (S502). Additionally, without a 5V power being provided, the TDMS receiver is also disabled. For example, with reference to FIG. 2, initially hotplug 208 is inactive, since there is not 5V power being deliver via HDMI power 220, TDMS input 204 is disabled.

Once the content receiver is connected to a content transmitter, the content transmitter will deliver 5V of power to hotplug 208 (S504). Once 5V of power is provided to the hotplug, the hotplug may enable the TDMS receiver (S506). For example, with reference to FIG. 2, once a connection is made, 5V of power may be delivered to hotplug 208 via HDMI power 220.

After power has been detected by the hotplug and the TDMS receiver has been enabled, the content transmitter will query the content receiver about optimum display settings (S508). For example, with reference to FIG. 3, once tablet 302 and STB 104 are connected, STB 104 will query tablet 302, via a DDC channel about its optimal display settings. After an initial query by STB 104, tablet 302 will send optimal display settings back to STB 104 via the DDC channel.

Once power has been delivered and display settings have been chosen, the content receiver will begin receiving content from the content transmitter (S510).

Figure 6:
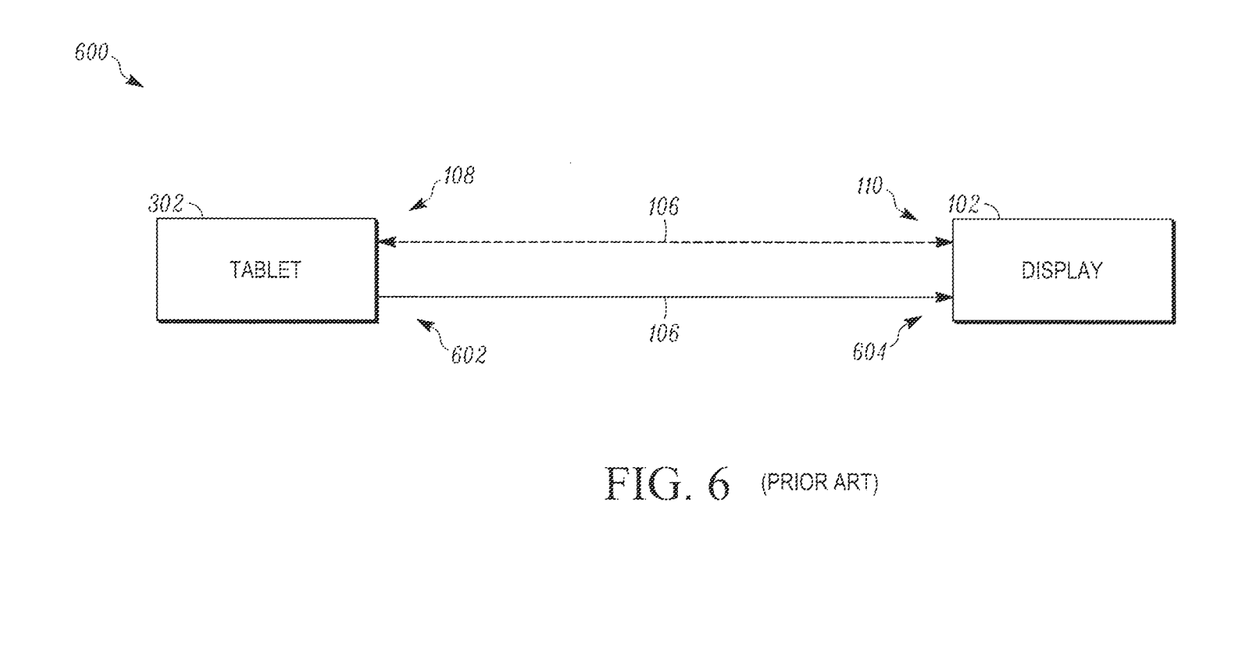
FIG. 6 illustrates a block diagram for a prior art tablet-display system 600.

FIG. 6 illustrates a block diagram for a prior art tablet and display system 600.

As illustrated in the figure, system 600 includes display 102, HDMI cable 106, connector 108, connector 110, tablet 302, an HDMI output port 602, and a connector 604.

Tablet 302 is arranged to transmit content, via HDMI output port 602, through HDMI cable 106. Display 102 is arranged to receive content transmitted by tablet 302 through HDMI cable 106, via connector 604.

In operation, a user may want to transmit content from tablet 302 to display 102. As shown in FIG. 2 main SOC 202 lacks a TDMS output and is only capable of receiving content via TDMS module 204.

If a user wants to transmit data from tablet 302 to display 102 an additional port is needed that is able to support that transmission of content via an HDMI cable. As shown in FIG. 6, in order to transmit data from tablet 302 to display 102, a user must move HDMI cable 106 to a second port that is able to transmit content to display 102.

The operation of system 600 is very similar to that of system 100 and 300 as described above. A user will want to transmit content from tablet 302 to display 102 using HDMI cable 106.

First tablet 302 is turned on and delivers power to hotplug module 208 via HDMI power 220. Hotplug module 208 detects a connection as described above with reference to FIG. 2. HDMI control module 206 may or may not receive a CEC signal depending on if tablet 302 and display 102 are CEC-enabled. Once power has been provided to main SOC 202 components and both tablet 302 and display 302 have been turned on, the optimum display setting is chosen via DDC channel 216 as described above.

After a display setting has been chosen tablet 302 will transmit content through HDMI cable 106 via TDMS pair 210, TDMS pair 212, and TDMS pair 214. The content transmitted over the TDMS pairs is received by TDMS module 204 and is displayed on display 102.

The problem with conventional ports as discussed above with reference to FIGS. 1-6, is that content is only allowed to travel in one direction. A port that is used to receive content is not capable of transmitting content, and a port that is used for transmitting content is not capable to receiving content. As illustrated in FIG. 6, if a table is to serve as both display and/or source device, two HDMI ports will be needed on the same device.

Because conventional ports are not capable of both transmitting and receiving content, if a user wants to send as well as receive content, two separate ports must be used. One of the ports must be dedicated to the transmission of content and the second port must be dedicated to receiving content.

The present invention provides a system and method for using a single port to transmit and receive content via an HDMI cable. A voltage comparator within the possible dual-function device will compare the voltage from a reference to that provided by the HDMI cable power signal. If the voltage difference is below a predetermined threshold, it will signal that the main SOC is the receiver of content from a content source via an HDMI cable. Once the function of the main SOC has been determined to be that of a receiver of content, a TDMS input portion is enabled.

If the voltage difference detected by the voltage comparator is above a predetermined threshold, it will signal that the main SOC is the transmitter of content to a content receiver via an HDMI cable. Once the function of the main SOC has been determined to be that of a transmitter of content, a TDMS output portion is enabled.

In accordance with aspects of the present invention, a tablet may be used as a source device, providing video to another display, or a sink device, displaying video from another source, using only a single HDMI port.

Example systems in accordance with aspects of the present invention will now be described with reference to FIGS. 7-9.

Figure 7:
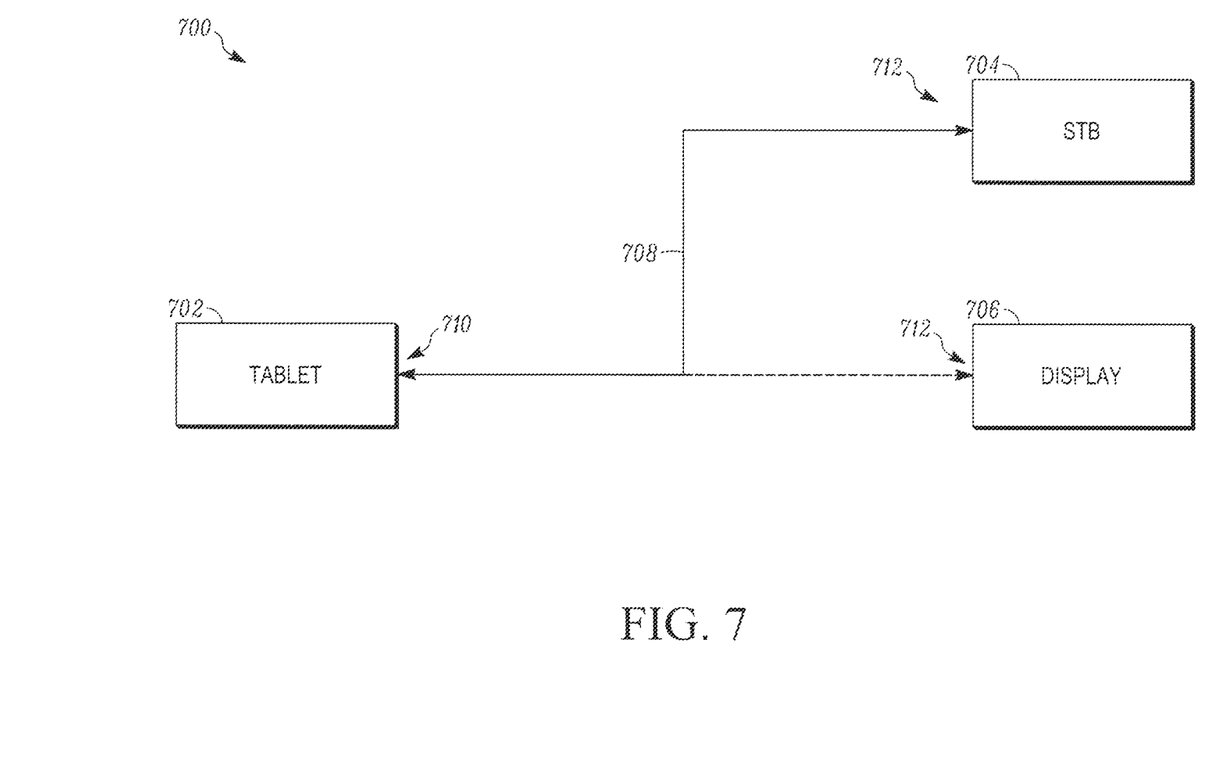
FIG. 7 illustrates a use case block diagram for a tablet-STB/display system 700, in accordance with aspects of the present invention.

FIG. 7 illustrates an example system 700 in which a tablet which is receiving content from a STB in a first state and transmitting content to a display in a second state, in accordance with aspects of the present invention. Accordingly, in accordance with aspects of the present invention, a tablet as described with reference to FIG. 7 includes an HDMI device that can be configured either as display or content provider (source) at the system setup stage.

As illustrated in the figure, system 700 includes a tablet 702, a STB 704, a display 706, an HDMI cable 708, a connector 710, and a connector 712.

Tablet 702 is arranged such that it is operable to receive content from STB 704 via HDMI cable 708. Tablet 702 is additionally arranged such that it is operable to transmit content to display 706 via HDMI cable 708.

The operation of system 700 will now be described in greater detail with additional reference to FIG. 8.

Figure 8:
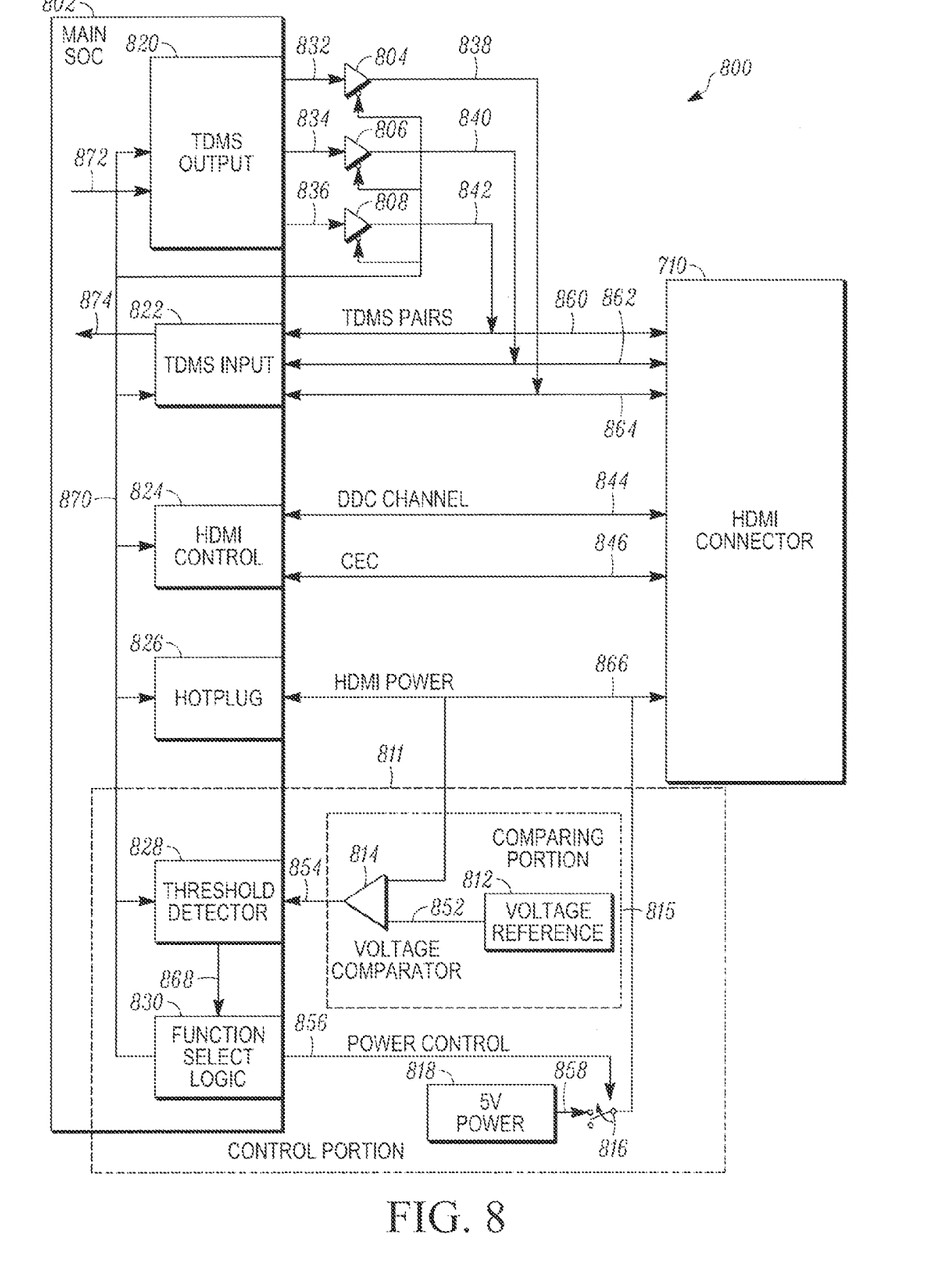
FIG. 8 illustrates a circuit diagram for a tablet (an HDMI device that can be configured either as display or content provider (source) at the system setup stage)-HDMI cable interface 800, in accordance with aspects of the present invention.

FIG. 8 illustrates a circuit diagram for two-way port and HDMI cable interface, in accordance with aspects of the present invention.

As illustrated in FIG. 8, circuit 800 includes HDMI connector 710, a main SOC 802, a switch 804, a switch 806, a switch 808, a TDMS output 820, a TDMS input 822, a HDMI control module 824, a hotplug module 826, and a control portion 811. Control portion 811 further includes comparing portion 815, switch 816, power supply 818, threshold detector 828, and function select logic 830. Comparing portion 815 further includes voltage reference 812 and voltage comparator 814. For purposes of brevity, elements (and their respective functions) that are common between circuit diagram 200 and circuit diagram 800 may not be described again.

Switch 804 is arranged such that it is operable to allow content to flow from TDMS output 820 to TDMS pair 864 via signal 838. Switch 806 is arranged such that it is operable to allow content to flow from TDMS output 820 to TDMS pair 862 via signal 840. Switch 808 is operable to allow content to flow from TDMS output 820 to TDMS 860 via signal 842.

Content being transmitted from TDMS output 820 is transmitted to a TDMS pair, and each TDMS pair then transmits the data to a display via HDMI connection 710. Content being transmitted from to TDMS input 822 is not able to travel to TDMS output 820 because signal 838, signal 840, and signal 842 are one way.

Control portion 811 is operable to instruct said output portion to output digital television audiovisual signals via an HDMI cable or to instruct said input portion to receive digital television audiovisual signals via an HDMI cable.

Switch 816 is operable to stop the flow of power from power supply 818 to HDMI power 866 in a first state, and is operable to allow the flow of power from power supply 818 to HDMI power 866 in a second state.

Power supply 818 is operable to provide power to HDMI power 866. Power supplied to HDMI power 866 is sent through an HDMI cable to another device via HDMI connector 710.

Threshold detector 828 is operable to detect different voltage level differences measured by voltage comparator 814. If the voltage detected is below the threshold, threshold detector 828 will instruct function select logic 830 to enable TDMS input 822. If the voltage detected is above the threshold, threshold detector 828 will instruct function select logic 830 to enable TDMS output 820.

Threshold detector 828 is operable to output a threshold detector signal to place a function select logic portion in a first state when the compared signal is greater than or equal to a predetermined threshold. Threshold detector 828 is further operable to output a threshold detector signal to place a function select logic portion in a second state when the compared signal is less than the predetermined threshold.

Function select logic 830 is operable to enable either TDMS output 820 or TDMS input 822 based on a threshold detector signal 868 from threshold detector 828. Function select logic 830 is additionally operable to change switch 816 from a first state to a second state via power control signal 856.

Comparing portion 815 contains voltage reference 812 and voltage comparator 814. Comparing portion 815 is operable to compare a first amount of voltage to a second amount of voltage and to output a compared signal based on the comparison between the first amount of voltage and the second amount of voltage.

Voltage reference 812 is operable to provide a constant 5V to voltage comparator 814. In this example the voltage level of voltage reference 812 is equal the voltage of the power being provided by the content source device. A non-limiting example of voltage reference 812 may be a diode, tube, or battery.

Voltage comparator 814 is operable to compare the voltage difference between voltage reference 812 and HDMI power 866. Voltage comparator is additionally operable to send the difference in voltage to threshold detector 828.

TDMS output 820 is operable to transmit 3 separate components of content to a TDMS pair. The red component of the content is sent to TDMS pair 864 via signal 832, switch 804, and signal 838. The green component of the content is sent to TDMS pair 862 via signal 834, switch 806, and signal 840. The blue component of the content is sent to TDMS pair 864 via signal 836, switch 808, and signal 842.

TDMS output 820 is an output portion operable to provide digital television audiovisual signals as output signals via an HDMI cable.

Content transmitted by TDMS output 820 is only able to travel in one direction. The content travels along TDMS pair 860, TDMS pair 862, and TDMS pair 864 to an HDMI cable via HDMI connector 710.

TDMS input 822 is operable to receive three separate components of content transmitted by STB 704. Each color component of the signal is carried by one of TDMS pair 860, TDMS pair 862, or TDMS pair 864.

TDMS input 822 is an input portion that is operable to receive digital television audiovisual signals as input signals via an HDMI cable.

In operation, a user will want to transmit content from STB 704, to tablet 702 using HDMI cable 708. First, a user will turn on STB 704, which will provide power to voltage comparator 814 and hotplug module 826 via HDMI power 866. Once hotplug module 826 is powered up it is able to provide power to switch 804, switch 806, switch 808, TDMS output 820, TDMS input 822, HDMI control module 824, threshold detector 828, and function select logic 830 via signal 870. In this example power that is supplied via HDMI power 866 is provided at a constant 5V.

Simultaneously, voltage comparator 814 is receiving power from voltage reference 812. In this example embodiment, voltage reference 812 provides power at constant 5V to voltage comparator 814.

Once voltage comparator 814 is receiving a power input from both HDMI power 866 and voltage reference 812, it may compare the voltage at which power is being delivered. The difference between the voltage levels of voltage reference 812 and HDMI power 866 is output to threshold detector 828 via compared signal 854.

In this example embodiment, STB 704 and voltage reference 812 are both providing a 5V signal to voltage comparator 814. Because both of the inputs to voltage comparator 814 are equal, voltage comparator 814 finds that there is a difference of 0V. This difference in voltage is transmitted to threshold detector 828 via compared signal 854.

In HDMI linked devices, power is supplied to the main SOC of the content receiving device by the content source device via the HDMI power signal. Since the voltage level of voltage reference 812 is the same as the voltage level of the power being provided via HDMI power 866, the difference is 0V. If voltage is only being supplied by voltage reference 812 and not HDMI power 866, the difference is 5V.

So if the difference in voltage is 0V it means that power is being supplied by the device at the opposite end of the HDMI cable, it also means that the device at the opposite end of the HDMI cable is the content source. If the difference in voltage is 5V it means that there is no power being supplied by the device at the opposite end of the HDMI cable, and it also means that the device at the opposite end of the HDMI cable is the content receiver.

At this point, threshold detector 828 will compare its predetermined voltage threshold with the voltage level it receives from voltage comparator 814 via compared signal 854 to determine whether or not it needs to enable TDMS output 820 or TDMS input 822. If the voltage output by voltage comparator 814 is below the predetermined threshold, threshold detector will enable TDMS input 822. If the voltage output by voltage comparator 814 is above the predetermined threshold, threshold detector will enable TDMS output 820. In this example embodiment the predetermined threshold is 3V.

At this point, threshold detector 828 receives a 0V signal from compared signal 854 which is below the predetermined threshold. Threshold detector sends signal 868 to function select logic 830 instructing it be in a first state. In a first state, function select logic 830 will enable TDMS input 822 and disable TDMS output 820, switch 804, switch 806, switch 808, and power source 818 via switch 816.

Once function select logic 830 has enabled TDMS input 822, tablet 702 and STB 704 determine optimum control and display settings via DDC 844 and CEC 846 as described above in FIG. 2.

Once a display setting has been chosen STB 704 will begin transmitting content to TDMS input 822 via TDMS pair 860, TDMS pair 862, and TDMS pair 864. Each TDMS pair transmits either a red, blue, or green component of the content that is being transmitted from STB 704 to tablet 702. The content is received by TDMS input 822 which then sends the content to tablet 702 via signal 874.

Suppose now after receiving content from STB 704, a user wants to transmit content from tablet 702 to display 706 via HDMI cable 708. First, the user will move HDMI cable connector 712 from STB 704 to display 706.

At this time voltage comparator 814 will be receiving a 5V signal from voltage reference 812 and a 0V signal from HDMI power 866. Voltage comparator finds that there is a 5V difference which it sends to threshold detector 828 via compared signal 854.

Threshold detector 828 receives compared signal 854 from voltage comparator 814 and finds that it is above the predetermined 5V threshold. Since compared signal 854 is above the voltage threshold, threshold detector instructs function select logic 830 to switch to a second state. In a second state, function select logic 830 will disable TDMS input 822 and enable TDMS output 820, switch 804, switch 806, and switch 808.

Since main SOC 802 is now acting as the content source it needs to provide power to the main SOC of the device at the opposite end of the HDMI cable 708 via HDMI power 866. To provide power, threshold detector 828 instructs function select logic 830 to additionally enable power supply 818 by turning on switch 816, via a switch signal 856.

Once power supply 818 is providing power to display 706 via HDMI power 866, HDMI control module 824 communicates with display 706 via DDC signal 844 and CEC signal 846 to determine optimum display settings.

After power source 818 has been enabled via switch 816 and display settings have been chosen by HDMI control module 824, function select logic 830 will turn on switch 804, switch 806, and switch 808 via signal 870. Once switch 804, switch 806, and switch 808 have been turned on they may allow TDMS output 820 to transmit content to TDMS pair 860, TDMS pair 862, and TDMS pair 864. The content TDMS output 820 transmits, is received from tablet 702 via incoming content signal 872.

Now, TDMS pair 860, TDMS pair 862, and TDMS pair 864 carry content to HDMI cable 708 via HDMI connector 710. Once the content has reached HDMI connector 710, it traverses HDMI cable 708 where it is received by display 706 via HDMI connector 712.

Figure 9:
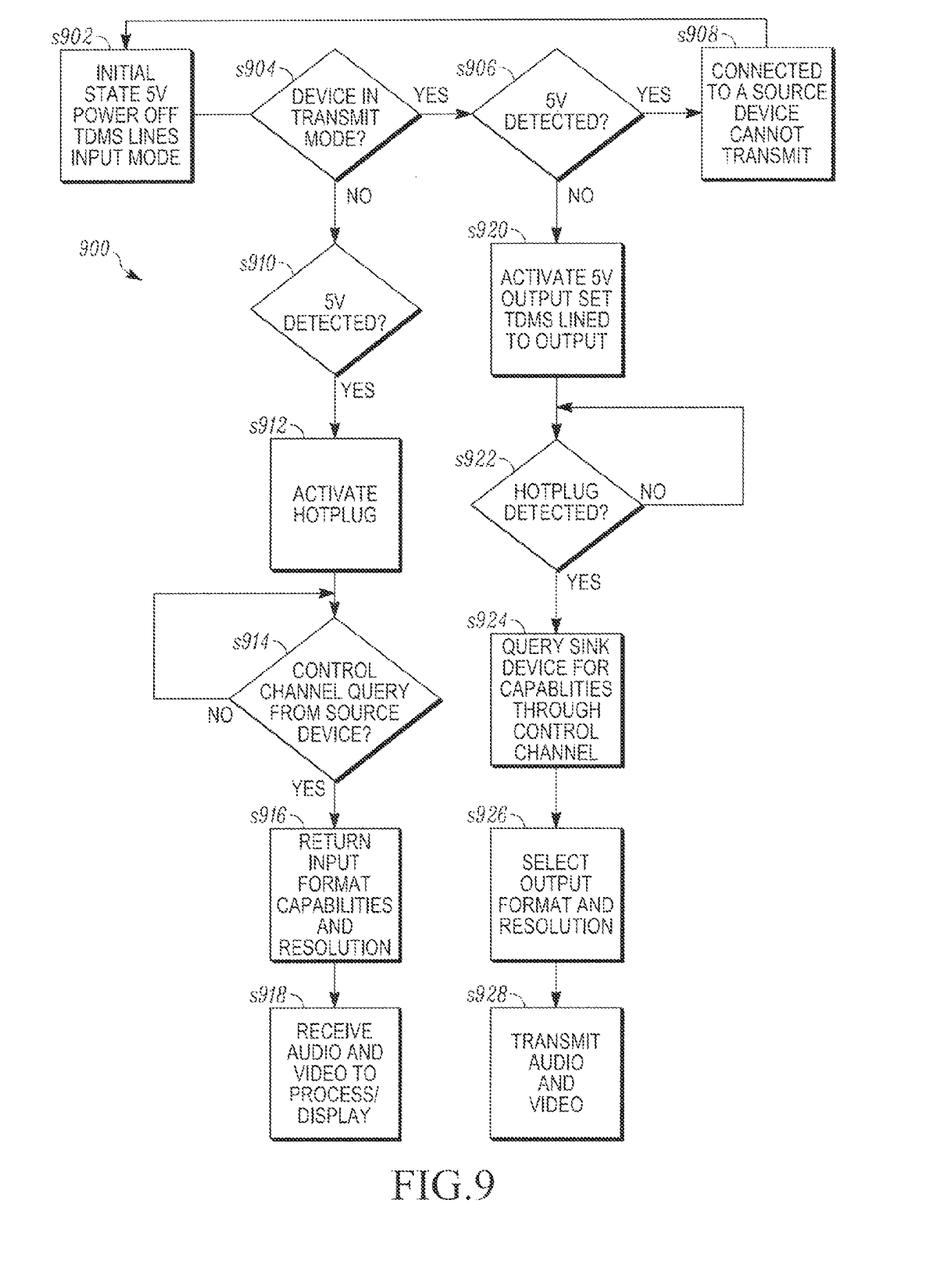
FIG. 9 illustrates a flowchart 900 for the operation of the device illustrated in FIG. 8.

FIG. 9 illustrates a flowchart 900 that describes the operation of FIG. 8.

First, an HDMI cable is connected to a device. In an initial state, the 5V power supply is off and TDMS input 822 is active (S902).

First, the device will check to see if it is in transmit mode (S904). If the device is in transmit mode it moves to (S906). If the device is not in transmit mode, it moves to (S910).

Once the device reaches (S910), the device waits until 5V is detected. For example, with reference to FIG. 8, voltage comparator 814 will compare the voltage of HDMI power line 866 and voltage reference 812, and output the difference to threshold detector 828. If the voltage difference is above the threshold it means that the device is connected to a content transmitter and that the device is in receiving mode.

Since the device is in receiving mode, it must wait for the content source device to deliver 5V of power to hotplug 826 via HDMI power line 866. Once 5V is detected, hotplug 826 is activated (S912).

After the hotplug has been activated and 5V of power has being delivered by the content transmitter, the device waits until it receives a control channel query for the source device (S914). For example, with reference to FIG. 8, once the source device and receiving device have been connected, the source device will query the receiving device about display settings via DDC channel 844. Once queried, HDMI control 824 will respond to the query via DDC channel 844 (S916).

Once power responding to the query, the receiving device receives content to display (S918). This corresponds to TDMS input 822 receiving content via TDMS pair 860, TDMS pair 862, and TDMS pair 864 and sending it to the display device via signal 874.

If the device had been in transmit mode and moved to (S906), the device would check to see if 5V of power had been detected. For example, with reference to FIG. 8, voltage comparator 814 will compare the voltage of HDMI power line 866 and voltage reference 812, and output the difference to threshold detector 828. If the voltage difference is above the threshold it means that the device is connected to a content receiver and that the device is in transmit mode. If the device is in transmit mode it moves to (S920). If the voltage difference is below the threshold it means the device is in receiving mode and the device moves to (S908).

Since the device is in transmit mode it has to activate the 5V power supply to deliver power to the receiving device (S922). For example, with reference to FIG. 8, if the device is in transmit mode, threshold detector 828 will instruct function select logic 830 to turn on 5V power 818, via switch 816. Additionally, function select logic 830 will turn off TDMS input 822 and turn on TDMS output 820.

Once power is delivered, the content transmitter will query the content receiver about display settings (S924). For example, with reference to FIG. 8, HDMI control 824 will query the content receiver via DDC channel 846.

After receive a response to the query from the content receiver, the content transmitter will select the output format and resolution (S926).

Once the output format and resolution have been selected, the device will transmit content to the content receiver (S928). For example, with reference to FIG. 8, TDMS output 820 will begin transmitting content via TDMS pair 860, TDMS pair 862, and TDMS pair 864.

In one aspect of the present invention, a single port may be used to both transmit and receive content from another device via an HDMI cable. A power source may be detected by comparing the voltage from an HDMI cable to that from a voltage reference. If the difference in voltages between the reference and the HDMI cable is below a predetermined threshold the main SOC may be enabled to receive content from a content source.

If the difference in voltages between the reference and the HDMI cable is above a predetermined threshold the main SOC may be enabled to provide power as well as content to a content receiver via an HDMI cable.

The benefit of the present invention is that a single port may be used to transmit and receive content. In conventional systems two separate ports must be used, a first port dedicated to the transmission of content and a second port dedicated to the reception of content. Being able to use a single port allows additional ports on a device to be used for other purposes and eliminates the need for additional HDMI cables to connect devices.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A device comprising:
   an output portion configured to be coupled to an audiovisual device via a cable, the cable including a data channel, a control channel and a power line and configured to transmit digital television audiovisual signals between the device and the audiovisual device, the output portion being configured to provide digital television audiovisual signals as output signals to the cable;
   an input portion configured to be coupled to the audiovisual device via the cable, the input portion being configured to receive digital television audiovisual signals as input signals from the cable; and
   a control portion configured to instruct the output portion to output the digital television audiovisual signals to the cable in a transmitting mode and to instruct the input portion to receive the digital television audiovisual signals from the cable in a receiving mode,
   wherein the control portion is configured to instruct the output portion to activate a power source to output power to the audiovisual device via the power line of the cable, to activate a plurality of switches connected to the data channel of the cable, to output display settings and the digital television audiovisual signals to the audiovisual device via the cable when the control portion detects that the device is in the transmitting mode and a first amount of power on the power line is not provided by the audiovisual device,
   wherein the control portion is configured to instruct the input portion to de-activate the power source to the power line, to return the display settings and receive the digital television audiovisual signals from the audiovisual device via the cable when the control portion detects that the device is in the receiving mode and the first amount of power on the power line is provided by the audiovisual device.

2. The device of claim 1, wherein the control portion comprises a function select logic portion configured to enable the output portion to output the digital television audiovisual signals to the cable in the transmitting mode and to enable the input portion to receive the digital television audiovisual signals from the cable in the receiving mode.

3. The device of claim 2, wherein the control portion further comprises a threshold detector configured to output a threshold detector signal to place the function select logic portion in one of the transmitting mode or the receiving mode.

4. The device of claim 3, wherein the control portion further comprises a comparing portion configured to compare the first amount of power to a reference power and to output a compared signal based on the comparison between the first amount of power and the reference power.

5. The device of claim 4,
   wherein the threshold detector is configured to output the threshold detector signal to place the function select logic portion in the transmitting mode when the compared signal is greater than or equal to a predetermined threshold, and
   wherein the threshold detector is further configured to output the threshold detector signal to place the function select logic portion in the receiving mode when the compared signal is less than the predetermined threshold.

6. The device of claim 5, further comprising:
   a switch coupled to the power source,
   wherein said function select logic portion is further configured to output a switch signal in the transmitting mode, and
   wherein said switch is operable to connect the power source to the power line based on the switch signal.

7. The device of claim 6, wherein the power source is configured to provide 5V.

8. The device of claim 1, wherein the control portion comprises a threshold detector configured to output a threshold detector signal.

9. The device of claim 8, wherein the control portion further comprises a comparing portion configured to compare the first amount of power to a reference power and to output a compared signal based on the comparison between the first amount of power and the reference power.

10. The device of claim 1, wherein the control portion comprises a comparing portion configured to compare the first amount of power to a reference power and to output a compared signal based on the comparison between the first amount of power and the reference power.

11. A method comprising:
    coupling an output portion of a device to an audiovisual device via a cable, the cable including a data channel, a control channel and a power line and being configured to transmit digital television audiovisual signals between the device and the audiovisual device, the output portion configured to provide digital television audiovisual signals as output signals to the cable;
    coupling an input portion of the device to the audiovisual device via the cable, the input portion configured to receive digital television audiovisual signals as input signals from the cable;
    configuring a control portion to instruct the output portion to output the digital television audiovisual signals to the cable in a transmitting mode and to instruct the input portion to receive the digital television audiovisual signals from the cable in a receiving mode;
    instructing, via the control portion, the output portion to activate a power source to output power to the audiovisual device via the power line, to activate a plurality of switches connected to the data channel to the audiovisual device, to output display settings and the digital television audiovisual signals to the audiovisual device via the cable when the control portion detects that the device is in the transmitting mode and a first amount of power on the power line is not provided by the audiovisual device; and
    instructing, via the control portion, the input portion to de-activate the power source to the power line, to return the display settings and receive the digital television audiovisual signals from the audiovisual device via the cable when the control portion detects that the device is in receiving mode and the first amount of power on the power line is provided by the audiovisual device.

12. The method of claim 11,
    wherein the instructing, via the control portion, the output portion to output the digital television audiovisual signals to the cable includes enabling, via a function select logic portion, the output portion to output the digital television audiovisual signals to the cable in the transmitting mode, and
    wherein the instructing, via the control portion, the input portion to receive the digital television audiovisual signals from the cable includes enabling, via the function select logic portion, the input portion to receive the digital television audiovisual signals from the cable in the receiving mode.

13. The method of claim 12, further comprising outputting, via a threshold detector, a threshold detector signal to place the function select logic portion in one of the transmitting mode or the receiving mode.

14. The method of claim 13, further comprising:
comparing, via a comparing portion, the first amount of power to a reference power, and
outputting, via the comparing portion, a compared signal based on the comparison between the first amount of power and the reference power.

15. The method of claim 14,
wherein the outputting, via the threshold detector, the threshold detector signal to place the function select logic portion in one of the transmitting mode or the receiving mode comprises outputting, via the threshold detector, the threshold detector signal to place the function select logic portion in the transmitting mode when the compared signal is greater than or equal to a predetermined threshold, and
wherein the outputting, via the threshold detector, the threshold detector signal to place the function select logic portion in one of the transmitting mode or the receiving mode comprises outputting, via the threshold detector, the threshold detector signal to place the function select logic portion in the receiving mode when the compared signal is less than the predetermined threshold.

16. The method of claim 15, further comprising:
outputting, via the function select logic portion, a switch signal in the transmitting mode; and
connecting, via a switch, the power source to the power line based on the switch signal.

17. The method of claim 16, wherein the connecting, via the switch, the power source to the power line based on the switch signal comprises connecting, via the switch, a 5V power source.

18. The method of claim 11, further comprising outputting, via a threshold detector, a threshold detector signal.

19. The method of claim 18, further comprising:
comparing, via a comparing portion, the first amount of power to a reference power, and
outputting, via the comparing portion, a compared signal based on the comparison between the first amount of power and the reference power.

20. The method of claim 11, further comprising:
comparing, via a comparing portion, the first amount of power to a reference power, and
outputting, via the comparing portion, a compared signal based on the comparison between the first amount of power and the reference power.

* * * * *

UNITED STATES PATENT AND TRADEMARK OFFICE
CERTIFICATE OF CORRECTION

| | | |
|---|---|---|
| PATENT NO. | : 9,053,657 B2 | Page 1 of 1 |
| APPLICATION NO. | : 13/572057 | |
| DATED | : June 9, 2015 | |
| INVENTOR(S) | : Yeqing Wang et al. | |

It is certified that error appears in the above-identified patent and that said Letters Patent is hereby corrected as shown below:

On the title page, item (73), in column 1, in "Assignee", line 1, delete "Holdings," and insert -- Holdings, LLC --, therefor.

Signed and Sealed this
Third Day of November, 2015

Michelle K. Lee
*Director of the United States Patent and Trademark Office*